Oct. 10, 1950  W. W. MEYER  2,525,365

SEAL

Filed April 20, 1946

Inventor
Walter W. Meyer
By: Spencer, Margall, Johnston & Cook
Att'ys.

Patented Oct. 10, 1950

2,525,365

UNITED STATES PATENT OFFICE 2,525,365

SEAL

Walter W. Meyer, Arlington Heights, Ill., assignor to Rotary Seal Company, Chicago, Ill., a corporation of Illinois Application April 20, 1946, Serial No. 663,655

8 Claims. (Cl. 286—11)

The present invention relates in general to shaft seals, and has more particular reference to the provision of improved means for sealing rotating shafts to prevent fluid leakage along the shaft past the seal.

Seals of the sort herein disclosed include a seal ring disposed about the shaft to be sealed, and having an annular face formed for running engagement with a complementary annular surface or seat, within which, and with respect to which, the shaft is adapted to turn, the sealing ring being mounted against turning movement with respect to the shaft. Suitable yielding means is provided for urging the seal ring into close contact with the seal seat for running engagement therewith. The seal, also, includes gasket means having an annular portion sealingly fitted upon the shaft, and a concentric annular portion sealingly engaging the seal ring, whereby fluid leakage along the surface of the shaft is blocked by the gasket portions sealed thereto, while leakage of fluid outwardly of the shaft is blocked by the gasket and the ring, leakage between gasket and ring being prevented by the sealing engagement therebetween, while leakage between the ring and its cooperating seat is prevented by the turning engagement of the highly polished engaging surfaces of the ring and its seat.

In seals of the character mentioned, the gasket is ordinarily frictionally fitted upon the shaft at a central opening therein, and is thus supported against relative turning movement with respect to the shaft, the gasket having annular portions, outwardly of its shaft engaging portions, which annular portions are drivingly and sealingly secured to the ring, whereby the ring is anchored against turning movement, with respect to the shaft, by the gasket. The gasket ordinarily comprises resilient rubber-like material in the interests of flexibility, the gasket, however, necessarily being of sufficiently thick section to drivingly connect the seal ring with the shaft and to support the ring in position to engage its cooperating seat. As a consequence, it has heretofore been necessary to sacrifice desirable gasket flexibility for the sake of adequate ring driving rigidity in the gasket portions between the ring and the shaft.

The seal ring ordinarily is urged into running engagement with its seat by spring means, usually a helical spring encircling the shaft and bearing on a shaft abutment, to yieldingly thrust the seal ring upon its seat, substantial spring thrust being required to maintain adequate sealing engagement where the sectional dimension of the gasket and, hence, its axial flexibility, is of the order required for ring driving purposes.

An important object of the present invention is to provide a shaft seal of the character described, wherein an exceedingly flexible gasket element is employed, thereby minimizing ring seating thrust required to maintain the ring on its seat, whereby seal wear is maintained at a minimum and a light, inexpensive thrust spring may be employed; a further object being to utilize a sealing gasket of maximum flexibility, while providing for the adequate driving of the ring through the gasket.

A further object is to provide a shaft seal, including a seal ring and a cooperating sealing gasket, wherein the gasket provides a diaphragm portion of maximum flexibility, and a ring driving portion which does not interfere with, or impair, the desirable flexibility of the diaphragm portion when the seal is in operation.

Another important object is to provide a shaft seal, including a seal ring and a flexible sealing diaphragm, wherein the ring has splined driving connection with a ring driving portion of the gasket and sealing engagement with a flexible diaphragm portion thereof.

A further object is to provide a shaft seal of of the character mentioned, which imparts negligible thrust axially on the shaft with which used; a further object being to provide a seal comprising a minimum number of parts that may be manufactured at low cost, and which will afford improved sealing characteristics.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Figure 1:
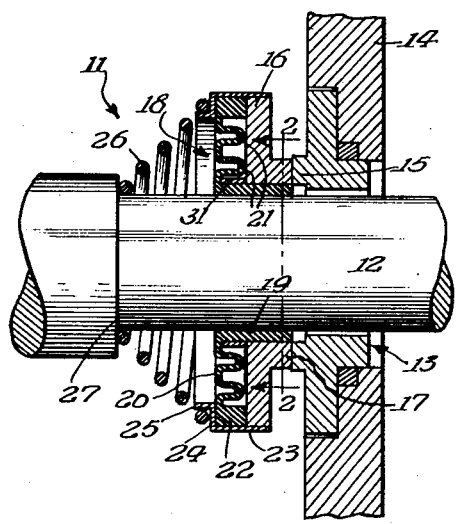
Fig. 1 is a sectional view through a shaft and seal embodying the present invention.

To illustrate the invention, the drawings show a shaft seal assembly 11 for use on a shaft 12 for sealing the same against leakage along the shaft, as through an opening 13 in a member 14 through which the shaft extends. In the illustrated embodiment, the member 14 comprises a wall, in the opening of which the shaft 12 is turnably mounted, although the member 14 may equally well comprise a portion of a structure turnably mounted on the shaft. In any event, the wall 14 is provided with an annular portion 15 surrounding the opening 13 to form a seal seat around the opening. The annular portion 15 may, as shown, be formed as a separate collar or gland sealingly secured to the member 14 at the opening 13, or it may be formed as an integral portion of the member 14. The seal assembly 11 comprises a ring element 16, adapted to loosely encircle the shaft 12 and having an annular portion 17 on one side for running engagement with the seat 15, the engaging surfaces of the seat 15 and of the seat engaging portion 17 being accurately finished to provide highly polished surfaces adapted to form a running seal.

The seal ring and its cooperating seat 15 may comprise any suitable wearing or bearing materials, although it is preferable to form one of the portions 15 and 17 of material which is softer than the other, whereby the portion comprising the softer material may take the wear, while the cooperating portion remains substantially unworn. As a consequence, the element comprising the softer material may be made as a replacement unit, and, to this end, it is desirable to form the ring 16, and particularly the bearing portions 17 thereof, of relatively softer material than the material of the seat 15, it being ordinarily more expedient to supply the ring 16 as a replacement part, the seat 15 being usually a permanent part of the apparatus with which the seal is used. The seat 15, thus, may comprise steel or other suitable seat forming material, while the bearing portions 17 may comprise bronze or other suitable metal, carbon, graphite, graphitized metal, or any other suitable bearing material for bearing engagement with the material of the seat.

Associated with the ring element 16, the seal comprises a gasket element 18, preferably formed of resilient rubber-like material, such as neoprene, or other resilient, flexible gasket material. The gasket 18 comprises a central cylindrical portion 19 adapted to snugly fit around, and engage upon, the surfaces of the shaft 12 on which it is mounted, the cylindrical portion being formed at one end with an integral outstanding flange 20 of relatively thin, flexible sectional dimensions. If desired, the flange 20 may be formed with annular pleats 21 arranged concentrically therein to increase the flexibility of the flange in the axial direction of the gasket. At its outer or marginal edge, the flange is formed with an annular rim 22 of preferably rectangular sectional configuration, said rim being appreciably thicker and more massive than the flexible flange portion 20 of the gasket.

The peripheral portions 22 of the gasket are preferably enclosed in a rim member 23, which may conveniently comprise an annular shell of relatively thin gauge sheet metal, said shell having a cylindrical wall portion adapted to enclose the marginal edge of the ring 16 and the rim 22 of the gasket, to maintain the same in registering alinement. The shell 23, also, preferably includes an inwardly extending flange portion 24 overlying the rim 22. The inner edge of the flange 24, also, is preferably offset to form an annular shoulder 25 for receiving an end of a thrust spring 26 forming a part of the seal assembly. This thrust spring 26 may be of any suitable or preferred character. As shown, the spring 26 may comprise a helical element encircling the shaft and bearing at one end upon the flange 24 outwardly of the shoulder 25, the spring, at its other end, bearing upon a shaft abutment which may, as shown, comprise a shoulder 27 formed on the shaft; or, the abutment may comprise a pin or pins, or other means, mounted on the shaft and extending therefrom in position to engage an end of the spring. The spring serves to compress and seal the gasket rim 22 against the marginal edge of the ring element 16, and serves, also, to yieldingly press the ring 16 upon the seal seat 15.

Figure 2:
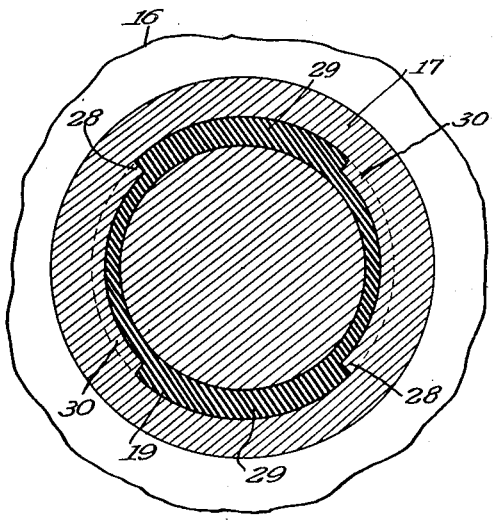
Fig. 2 is a sectional view taken substantially along the line 2—2 in Fig. 1.
Figure 3:
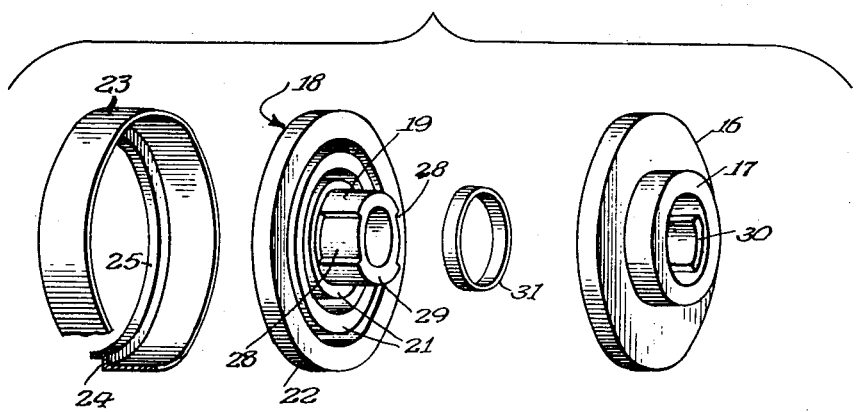
Fig. 3 is an exploded view of parts of the seal shown in perspective.

The cylindrical portion 19 of the gasket comprises a sleeve which encircles and frictionally engages the surface of the shaft on which mounted. This sleeve is preferably of substantially greater sectional thickness than the thickness of the diaphragm flange 20. The sleeve extends from the flange 20 along the shaft and within the shaft receiving opening of the ring 16, whereby the ring 16 encircles the sleeve 19. The ring and sleeve, also, are formed with cooperating spline portions, as shown more particularly in Fig. 2 of the drawings, whereby the ring 16 is mounted against turning movement with respect to the sleeve 19, which, in turn, through its frictional connection on the shaft 12, is held against turning movement with respect to the shaft. The ring 16 is preferably snugly fitted on the spline portion of the sleeve 19, although it may move axially with respect to the sleeve.

Any preferred spline configuration may be employed to connect the ring 16 on the sleeve 19. As shown, the sleeve 19 is provided with a plurality of arcuate depressions 28 and intermediate projections or ribs 29 extending longitudinally in the outer surfaces of the sleeve, and the ring 16 is formed with corresponding inwardly extending projections 30 axially of its sleeve receiving opening, said projections 30 interfitting in the depressions 28 on opposite sides of the projections 29.

The ring 16 is, thus, drivingly connected with the sleeve portion 19 of the sealing gasket and, through said sleeve portion, the ring is drivingly connected with the shaft. The sleeve portion 19 of the gasket, also, forms a fluid-tight seal around the shaft. In order to assure tight sealing and driving engagement of the sleeve 19 with the shaft, a holding ring 31 may be applied around the sleeve 19 between the ring 16 and the flange portions 20 of the gasket, the groove portions 28 preferably not extending in the sleeve in the ring carrying end thereof. The marginal portions 22 of the gasket are firmly sealed to the marginal portions of the ring 16. The ring, in turn, under the influence of the spring 26, forms a tight running seal with the seal seat 15. As a consequence, the shaft is sealed against fluid leakage along the shaft past the seal and through the opening 13 in either direction.

Where the ring 16 comprises metal, the spline projections 30 thereof may be formed by a broaching operation during the fabrication of the ring as a machine finished element. Where the ring comprises carbon, graphite, or other moldable material, the spline projections 30 may be molded in the ring during the formation thereof in a suitable pressing die or mold. The gasket 18 of rubber-like material may, also, be produced inexpensively as a molded product in a suitable die. Such die may be configurated to form the sleeve 19 including the spline depressions and projections 28 and 29, the gasket flange 20, including pleats 21, if desired, as well as the sealing rim 22, all as an integral piece in finished form as delivered from the forming mold.

The foregoing construction utilizes a gasket of maximum flexibility in the diaphragm portions 20, whereby minimum spring pressure is required to maintain the seal in sealing engagement with the seat 15. The spring 26, consequently, may be of exceedingly light character, sufficient only to maintain adequate sealing engagement of the ring 16 with the seat 15, the spring 26 being not required to overcome any ring driving stiffness in the gasket. Axial thrust imparted on the shaft by the spring 26 is, thus, a negligible factor, which is of prime importance where the seal is applied to tiny, light weight shafts.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A shaft seal comprising the combination, with a seal ring adapted to encircle the shaft and having a shaft receiving opening therein and an annular seal surface for engaging and forming a running seal with a cooperating seal seat, of a gasket of resilient material having a shaft encircling sleeve portion sealingly and drivingly engaging the shaft, and a flange portion extending outwardly of said sleeve portion in position to sealingly engage said seal ring, and means to directly connect said ring drivingly with said sleeve portion, comprising means formed on said sleeve portion of resilient rubber-like material drivingly interfitting with said ring at the shaft receiving opening thereof.

2. A shaft seal comprising the combination, with a seal ring adapted to encircle the shaft and having a shaft receiving opening therein and an annular seal surface for engaging and forming a running seal with a cooperating seal seat, of a gasket of resilient material having a shaft encircling sleeve portion sealingly and drivingly engaging the shaft, and a flange portion extending outwardly of said sleeve portion sealingly engaging said seal ring, said sleeve portion having an integral end portion thereof fitting snugly within the opening of the sealed ring, whereby to directly connect said ring drivingly with said sleeve portion and with the shaft.

3. A shaft seal comprising the combination, with a seal ring adapted to encircle the shaft and having a shaft receiving opening therein and an annular seal surface for engaging and forming a running seal with a cooperating seal seat, of a gasket of resilient material having a shaft encircling sleeve portion sealingly and drivingly engaging the shaft, and a flange portion extending outwardly of said sleeve portion in sealing engagement with said seal ring, said sleeve portion having an integral end portion thereof fitting snugly within the opening of the sealed ring, and resilient spline means formed on said integral end portion and interfitting with said ring to drivingly connect the ring with said sleeve portion and with the shaft.

4. A shaft seal comprising the combination, with a seal ring adapted to encircle the shaft and having a shaft receiving opening therein and an annular seal surface for engaging and forming a running seal with a cooperating seal seat, of a gasket of resilient material having a shaft encircling sleeve portion sealingly and drivingly engaging the shaft, and a flange portion extending outwardly of said sleeve portion sealingly engaging said seal ring, said opening in the ring snugly receiving said sleeve portion therein, and said sleeve and ring having interfitting shoulders, whereby said sleeve portion may drivingly engage both the shaft and said ring.

5. A shaft seal comprising the combination, with a seal ring adapted to encircle the shaft and having a central shaft receiving opening therein and an annular seal surface for engaging and forming a running seal with a cooperating seal seat, of a gasket of resilient material having a shaft encircling sleeve portion adapted to sealingly and drivingly engage the shaft, and a flexible flange portion extending outwardly of said sleeve portion in position to sealingly engage said seal ring at the peripheral edges of said flange, means to drivingly connect said ring with said sleeve portion, comprising interfitting spline means formed integrally on said sleeve portion and on said ring at the shaft receiving opening therein, and spring means adapted to encircle the shaft and urge said ring into sealing engagement with said seat, said spring serving also to hold the peripheral portions of the flange portion of the gasket in sealing contact with said ring.

6. A shaft seal comprising the combination with a seal ring element adapted to encircle the shaft, and having an annular seal surface for engaging and forming a running seal with a cooperating annular seal seat element, with respect to which said shaft is relatively turnable, of gasket means for sealing the ring element to the shaft, said gasket having a sleeve portion fitting snugly upon the shaft and within the shaft receiving opening of the ring, resilient spline means forming shoulders on said sleeve portion interengaging with the ring for drivingly connecting the same, and spring means for urging the ring into sealing engagement with its seat.

7. A shaft seal comprising the combination with a seal ring element adapted to encircle the shaft, and having an annular seal surface for engaging and forming a running seal with a cooperating annular seal seat element, with respect to which said shaft is relatively turnable, of gasket means for sealing the ring element to the shaft, said gasket having a web portion including a peripheral rim, for annular sealing engagement with said ring element, and a sleeve fitting snugly upon the shaft and within the shaft receiving opening of the ring, resilient spline means forming shoulders on said sleeve portion interengaging with the ring for drivingly connecting the same, and spring means encircling the shaft and bearing upon the rim of said gasket to sealingly press the same upon the ring and to press the ring upon the seal seat.

8. A shaft seal comprising the combination with a seal ring element adapted to encircle the shaft, and having an annular seal surface for engaging and forming a running seal with a cooperating annular seal seat element, with respect to which said shaft is relatively turnable, of gasket means for sealing the ring element to the shaft, said gasket comprising resilient material having a shaft encircling sleeve portion sealingly and drivingly engaging the shaft, and a flexible flange portion extending outwardly of said sleeve portion in sealing engagement with said seal ring, said sleeve portion fitting within the shaft receiving opening of said ring, and resilient spline means formed on said sleeve portion and interfitting with said ring at the opening thereof to drivingly connect said ring with said gasket to relieve said flange portion of driving strain.

WALTER W. MEYER.

REFERENCES CITED

The following references are of record in the file of this patent:

UNITED STATES PATENTS

| Number | Name | Date |
|---|---|---|
| Re. 22,666 | Snyder | Aug. 14, 1945 |
| 2,200,413 | Christman et al. | May 14, 1940 |
| 2,233,624 | Magnesen | Mar. 4, 1941 |
| 2,272,526 | Kuran | Feb. 10, 1942 |
| 2,277,196 | Arf | Mar. 24, 1942 |
| 2,308,114 | Schjolin | Jan. 12, 1943 |
| 2,373,463 | Curtis | Apr. 10, 1945 |
| 2,463,695 | Jensen | Mar. 8, 1949 |